United States Patent
Wang et al.

(10) Patent No.: US 10,499,280 B2
(45) Date of Patent: Dec. 3, 2019

(54) NETWORK INTERFACE COMMUNICATION

(71) Applicant: Hewlett Packard Enterprise Development LP, Houston, TX (US)

(72) Inventors: Shuai Wang, Beijing (CN); Jun Qing Xie, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/500,637

(22) PCT Filed: Nov. 30, 2015

(86) PCT No.: PCT/CN2015/095934
§ 371 (c)(1),
(2) Date: Jan. 31, 2017

(87) PCT Pub. No.: WO2017/091931
PCT Pub. Date: Jun. 8, 2017

(65) Prior Publication Data
US 2018/0041920 A1    Feb. 8, 2018

(51) Int. Cl.
*H04W 76/15* (2018.01)
*H04W 28/08* (2009.01)
*H04W 28/02* (2009.01)
*H04L 12/709* (2013.01)
*H04W 84/12* (2009.01)

(52) U.S. Cl.
CPC ........... *H04W 28/08* (2013.01); *H04L 45/245* (2013.01); *H04W 28/02* (2013.01); *H04W 76/15* (2018.02); *H04W 84/12* (2013.01)

(58) Field of Classification Search
CPC ... H04W 28/08; H04W 76/15; H04W 76/025; H04W 84/12
See application file for complete search history.

(56) References Cited

U.S. PATENT DOCUMENTS

| | | | |
|---|---|---|---|
| 8,867,490 | B1 | 10/2014 | Krishna et al. |
| 2013/0039337 | A1 | 2/2013 | Hwang et al. |

(Continued)

FOREIGN PATENT DOCUMENTS

| | | |
|---|---|---|
| CN | 101854734 | 10/2010 |
| CN | 101895525 | 11/2010 |

(Continued)

OTHER PUBLICATIONS

"3G/Wi-Fi Seamless Offload," Mar. 12, 2010, pp. 1-11, Qualcomm Incorporated.

(Continued)

*Primary Examiner* — Lakeram Jangbahadur
(74) *Attorney, Agent, or Firm* — Sheppard Mullin Richter & Hampton

(57) ABSTRACT

An example system can include a communication device to communicate with a network. The system can include a long-term evolution (LTE) interface to communicatively couple the communication device to the network. The system can include a wireless local area network (WLAN) interface to communicatively couple the communication device to the network. A session associated with each of the LTE interface and the WLAN interface can be maintained together and an identical IP address can be associated with the LTE interface and the WLAN interface.

10 Claims, 5 Drawing Sheets

(56) References Cited

U.S. PATENT DOCUMENTS

| | | | |
|---|---|---|---|
| 2013/0077482 A1 | 3/2013 | Krishna et al. | |
| 2013/0279335 A1 | 10/2013 | Ahmadi | |
| 2013/0322347 A1* | 12/2013 | Alex | H04W 74/00 370/329 |
| 2015/0092688 A1* | 4/2015 | Jeong | H04W 8/26 370/329 |
| 2015/0181514 A1 | 6/2015 | Belghoul et al. | |
| 2015/0208309 A1 | 7/2015 | Taneja et al. | |
| 2016/0165508 A1* | 6/2016 | Jin | H04W 36/14 370/331 |
| 2016/0174107 A1* | 6/2016 | Kanugovi | H04L 12/28 370/236 |
| 2017/0238210 A1* | 8/2017 | Belghoul | H04W 28/08 370/331 |

FOREIGN PATENT DOCUMENTS

| | | | | |
|---|---|---|---|---|
| CN | 101895525 A | * | 11/2010 | H04W 8/26 |
| CN | 104349386 A | * | 8/2013 | H04W 28/08 |
| CN | 104349386 | | 2/2015 | |
| CN | 104349386 A | * | 2/2015 | H04W 72/12 |
| EP | 2863683 A1 | | 4/2015 | |

OTHER PUBLICATIONS

"3rd Generation Partnership Project; Technical Specification Group Services and System Aspects; Feasibility Study of Mobility between 3GPP-WLAN Interworking and 3GPP Systems (Release 8)", 3GPP Standard; 3GPP TR 23.827, 3rd Generation Partnership Project (3GPP), Mobile Competence Centre ; 650, Route Des Lucioles ; F-06921 Sophia-Antipolis Cedex; France, No. V 0.4.0. Sep. 1, 2007 pp. 1-46, XP050380909.

3GPP TS 23.402, "Architecture enhancements for non-3GPP accesses", Dec. 2016, Release 14, Version 14.2.0, 307 pages.

H. Soliman, Ed. "Mobile IPv6 Support for Dual Stack Hosts and Routers", RFC 5555, Jun. 2009, 82 pages.

International Search Report and Written Opinion received for PCT Application No. PCT/CN2015/095934, dated Aug. 24, 2016, 7 pages.

Search Report and Search Opinion Received for European Application No. 15898476.5, dated Jun. 18, 2018, 12 pages.

Tsirtsis, et al., "Flow Bindings in Mobile IPv6 and Network Mobility (NEMO) Basic Support", RFC 6089, Jan. 2011, 62 pages.

* cited by examiner

NETWORK INTERFACE COMMUNICATION

BACKGROUND

Networks such as enterprise wireless networks are used to provide information technology (IT) services to businesses. The networks and their corresponding connectivity are used to satisfy Quality of Service (QoS) demands. These networks are using more and more bandwidth as the demands and/or loads of the applications run on these networks increases.

DETAILED DESCRIPTION

Networks are used to meet the demands of Quality of Service (QoS) requests and an increasing demand for bandwidth to run growing applications. The connectivity of the networks are used to support continuity, simplicity, and security in relation to applications and/or programs run for the benefit of an enterprise (e.g., business, company, etc.). In order to provide these benefits, interfaces to connect to the network can include using long-term evolution (LTE) and wireless local area networks (WLANs) to provide connectivity. In previous approaches, when connecting to a WLAN interface, a connection with an LTE interface can be terminated as the WLAN interface may have a higher priority than the LTE interface. This can decrease continuity and simplicity of the connectivity of the network. In order to avoid this decrease in continuity, a hybrid network can be used to connect to a WLAN interface and an LTE interface without terminating either of the interfaces.

In order to connect to a WLAN interface and an LTE interface, a same indicator (e.g., an IP address) associated with both interfaces can be used. While a data session (associated with a transmission control protocol (TCP) connection) can be maintained with the WLAN interface and the LTE interface, data transferred from the network to a communication device (e.g., a computer, a laptop, a phone, a smartphone, etc.) can be limited to a single interface at a particular time.

Figure 1:
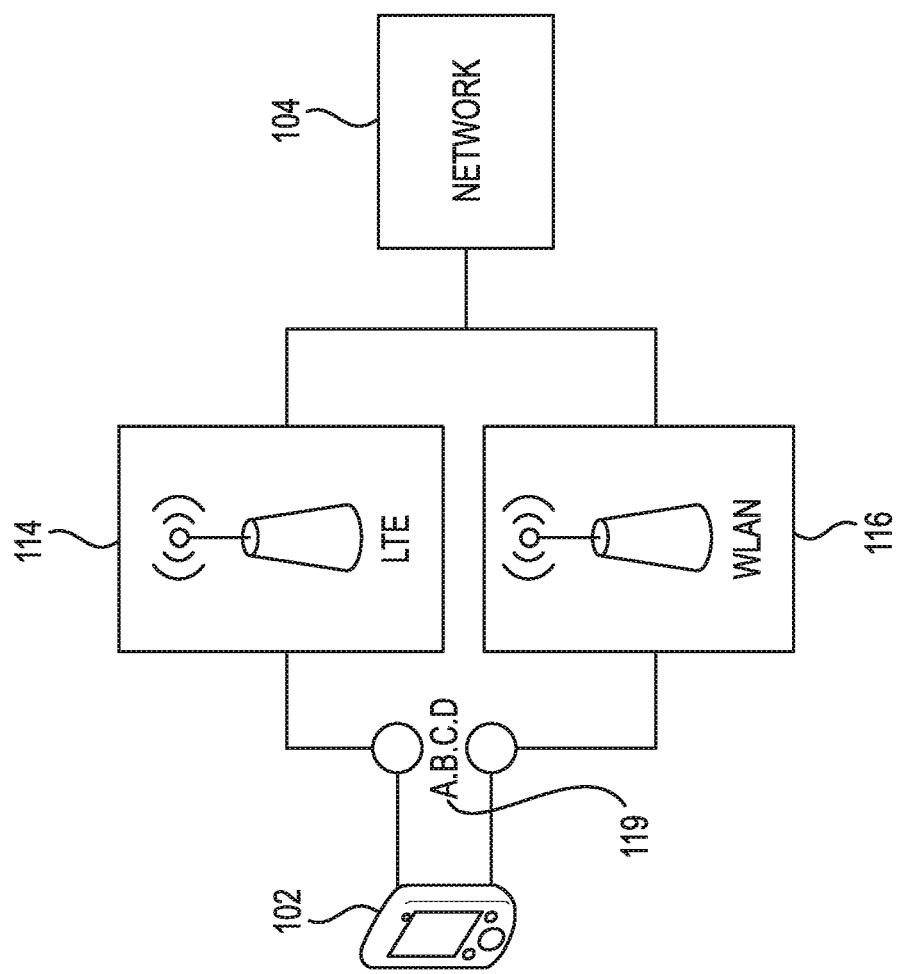
FIG. 1 illustrates an example of a system for network interface communication according to the present disclosure.

FIG. 1 illustrates an example of a system 100 for network interface communication according to the present disclosure. The system 100 can include a communication device (e.g., a computer, a laptop, a phone, a smartphone, etc.) 102 that is in communication with a network (and/or internet service) 104. The communication device 102 can be coupled to a network 104. Coupling can refer to being directly connected and/or in communication with or it can refer to being coupled through additional elements that are then coupled to an identified element. For example, the communication device 102 can be coupled to the network 104 through additional elements, such as a long-term evolution (LTE) access point (AP) 114. The network 104 can be an enterprise access network.

The LTE AP 114 can be in communication with the communication device 102 through an LTE signal. The communication device 102 is identified by the LTE AP 114 using an IP address ("A.B.C.D") 119. A session can be maintained (e.g., a TCP session) with the communication device 102 independent of whether the communication device 102 is using an LTE interface to send data and/or whether the LTE interface is indicated as the interface to send and/or receive data. An interface is referred to herein as components used to provide network connectivity to a particular network. For example, an LTE interface can include those components for connecting to an LTE network. The components can include LTE software and/or hardware that enables a device to connect to a network using LTE such as an LTE chip, an antenna, an LTE signal and/or an LTE access point. A session can refer to an interface maintaining a connection and/or communication with the communication device 102. For example, an LTE interface 114 can connect to a device using an IP address and maintain that connection (or session) using that IP address without disconnecting. In the alternative, if the connection was broken, an IP address would need to be relocated and used again for an additional connection which could refer to an additional session.

A WLAN AP 116 can refer to a device that allows wireless devices to connect to a wired network using Wi-Fi and/or related standards. For example, an AP can connect a router (via a wired network) as a standalone device and/or it can be an integral component of the router itself. A WLAN signal can allow the communication device 102 to communicate through the gateway 110 to the network 104. A gateway refers to a network point that acts as an entrance to another network. For example, a node or stopping point of a network can be either a gateway node and/or a host (end-point) node. A same IP address ("A.B.C.D") 119 can be stored at the communication device 102 for both the LTE interface associated with LTE AP 114 and the WLAN interface associated with WLAN AP 116.

In order to maintain continuity of signal during a chance of interface (e.g., switching from an LTE interface to a WLAN interface or vice versa), a same IP address 119 is maintained for both the LTE interface and the WLAN interface at the communication device 102. This IP address 119 can be propagated and assigned to each of the LTE and WLAN interfaces associated with the LTE signal 114 and the WLAN signal 116, respectively.

A modification to an operating system (OS) of the communication device 102 can be made to turn on both the WLAN interface and the LTE interface at the same time and connect both interfaces to a network 104 simultaneously with a same IP address 119. A default route can be supported for switching outbound traffic (e.g., associated with an uplink) between the two interfaces. When a particular interface is associated with transferring data, the other interface is not disconnected. For example, when a WLAN interface is associated with transferring data and the LTE interface is not associated with transferring data, the LTE interface maintains a session connection even though data is not transferred through the LTE interface. When the interface for transferring data is switched to be associated with the LTE interface, the WLAN interface maintains a session connection and no longer transfer data. In this way, a session connection is maintained for both the LTE interface and the WLAN interface but whether each of the interfaces is indicated for transferring data changes.

Figure 2:
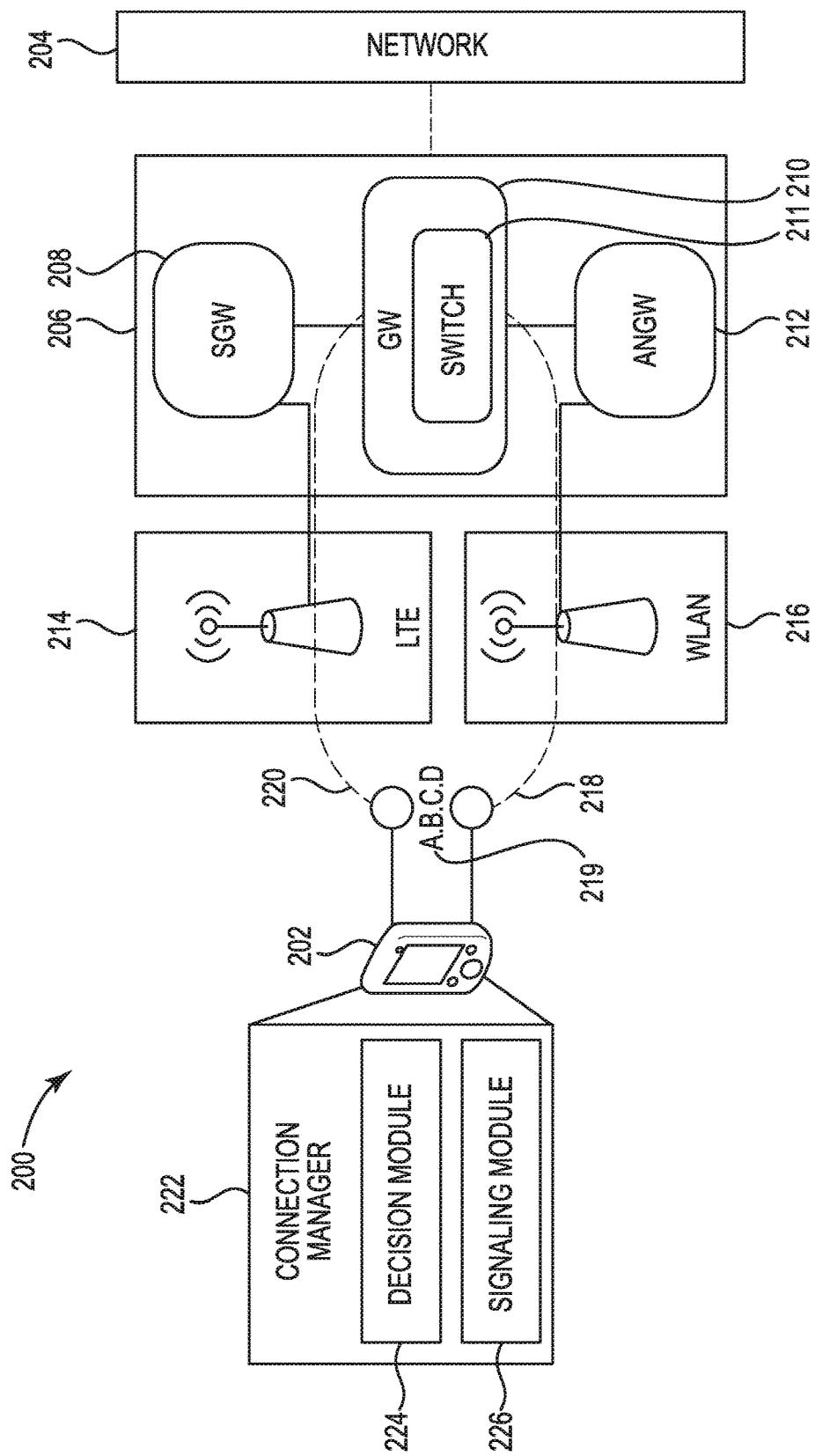
FIG. 2 illustrates an example of a system for network interface communication according to the present disclosure.

FIG. 2 illustrates an example of a system 200 for network interface communication according to the present disclosure. The system 200 can include a communication device (e.g., a computer, a laptop, a phone, a smartphone, etc.) 202 that is in communication with a network (and/or internet service) 204. The communication device 202 can be coupled to a number of gateways 206. A first gateway 210 of the number of gateways 206 can be coupled to the network 204. Coupling can refer to being directly connected and/or in communication with or it can refer to being coupled through additional elements that are then coupled to an identified element. For example, the first gateway 210 can be coupled to the network 204 through additional elements, such as a second gateway ("SGW") 208 and an LTE access point (AP) 214.

The network 204 can be an enterprise access network. The gateway 210 can be a Packet Data Network Gateway (PDN GW) used in an Evolved Packet Core (EPC) that is maintained within the network 204 (e.g., an enterprise access network). The gateway 210 can include a switch 211. The switch 211 can be a switch daemon that processes request messages associated with an interface. The switch 211 can enable a particular interface, such as an LTE interface or a WLAN interface.

The gateway 210 can be in communication with the communication device 202 through a Serving Gateway ("SGW") 208 in an Evolving Packet Core (EPC) that couples to an LTE access point (AP) 214. The LTE AP 214 is in communication with the communication device 102 through an LTE signal 220. The communication device 202 is identified by the LTE AP 214 using an IP address ("A.B.C.D") 219. The gateway 210 can maintain a session (e.g., a TCP session) with the communication device 202 independent of whether the communication device 202 is using an LTE interface to send data and/or whether the LTE interface is indicated as the interface to send and/or receive data.

The gateway 210 can be in communication with the communication device 202 through an additional gateway ("ANGW") 212 that couples to a WLAN access point (AP) 216. A WLAN AP 216 can refer to a device that allows wireless devices to connect to a wired network using Wi-Fi and/or related standards. For example, an AP can connect a router (via a wired network) as a standalone device and/or it can be an integral component of the router itself. A WLAN signal 218 can allow the communication device 202 to communicate through the gateway 210 to the network 204.

The additional gateway 212 can be an Access Network Gateway (ANGW) or an enhanced Packet Data Gateway (ePDG). An ePDG can refer to a gateway that secures data transmission with a device associated with a user connected to an EPC with an untrusted non-3GPP access. The ANGW 212 can include a database that stores mapping between a MAC address and an international mobile subscriber identity (IMSI). In this way, a same IP address ("A.B.C.D") 219 can be stored in the database of the ANGW 212. The IP address 219 can be the same IP address for both the LTE interface associated with LTE AP 214 and the WLAN interface associated with WLAN AP 216.

In order to maintain continuity of signal during a network switch (e.g., switching from an LTE interface to a WLAN interface or vice versa), a same IP address 219 is maintained for both the LTE interface and the WLAN interface at the communication device 202. This IP address 219 can be propagated to the database of ANGW 212 and SGW 208 and be assigned to each of the LTE and WLAN interfaces associated with the LTE signal 214 and the WLAN signal 216, respectively.

A modification to an operating system (OS) of the communication device 202 can be made to turn on both the WLAN interface and the LTE interface at the same time and connect both interfaces to a network 204 simultaneously with a same IP address 219. A default route can be supported for switching outbound traffic (e.g., associated with an uplink) between the two interfaces. When a particular interface is associated with transferring data, the other interface is not disconnected. For example, when a WLAN interface is associated with transferring data and the LTE interface is not associated with transferring data, the LTE interface maintains a session connection even though data is not transferred through the LTE interface. When the interface for transferring data is switched to be associated with the LTE interface, the WLAN interface maintains a session connection and no longer transfer data. In this way, a session connection is maintained for both the LTE interface and the WLAN interface but whether each of the interfaces is indicated for transferring data changes.

A communication device 202 can include a connection manager 222. The connection manager 222 can include a number of engines and/or modules to perform a number of functions. An engine and/or a plurality of engines may include a combination of hardware and programming (e.g., instructions executable by the hardware), but at least hardware, that is configured to perform functions described herein (e.g., determining a decision, signaling, etc.). While a number of modules are illustrated in FIG. 2 (e.g., decision module 224, signaling module 226), the engines describe above can be used to perform the functions of the modules and/or the modules can perform in conjunction with the engines. The programming may include program instructions (e.g., software, firmware, etc.) stored in a memory resource (e.g., computer readable medium, machine readable medium, etc.) as well as hard-wired program (e.g., logic).

The connection manager 222 can include a decision module 224 and a signaling module 226. The decision module 224 can include software and/or a combination of software, hardware, and/or programming. The decision module 224 can perform a number of decisions related to manual and/or automatic switch operations. A decision engine (associated with decision module 224) may include hardware and/or a combination of hardware and programming, but at least hardware to determine a decision of whether to transfer data via a WLAN interface or an LTE interface). For example, a decision engine can perform similar functions as the decision module 226.

The connection manager 222 can include a signaling module 226. A signaling module 226 can include software and/or a combination of software, hardware, and/or programming. The signaling module 226 can send a request message signaling a particular interface to be used for transferring data. The request message can be sent to GW 210. The switch 211 can receive the request message and enable a particular interface to be used. A signaling engine can perform similar functions as a signaling module 226. A signaling engine (associated with signaling module 226) may include hardware and/or a combination of hardware and programming, but at least hardware to send a request message to signal a preference of an interface to transfer data (e.g., via a WLAN interface or an LTE interface). For example, a decision engine can perform similar functions as the decision module 226.

Figure 3:
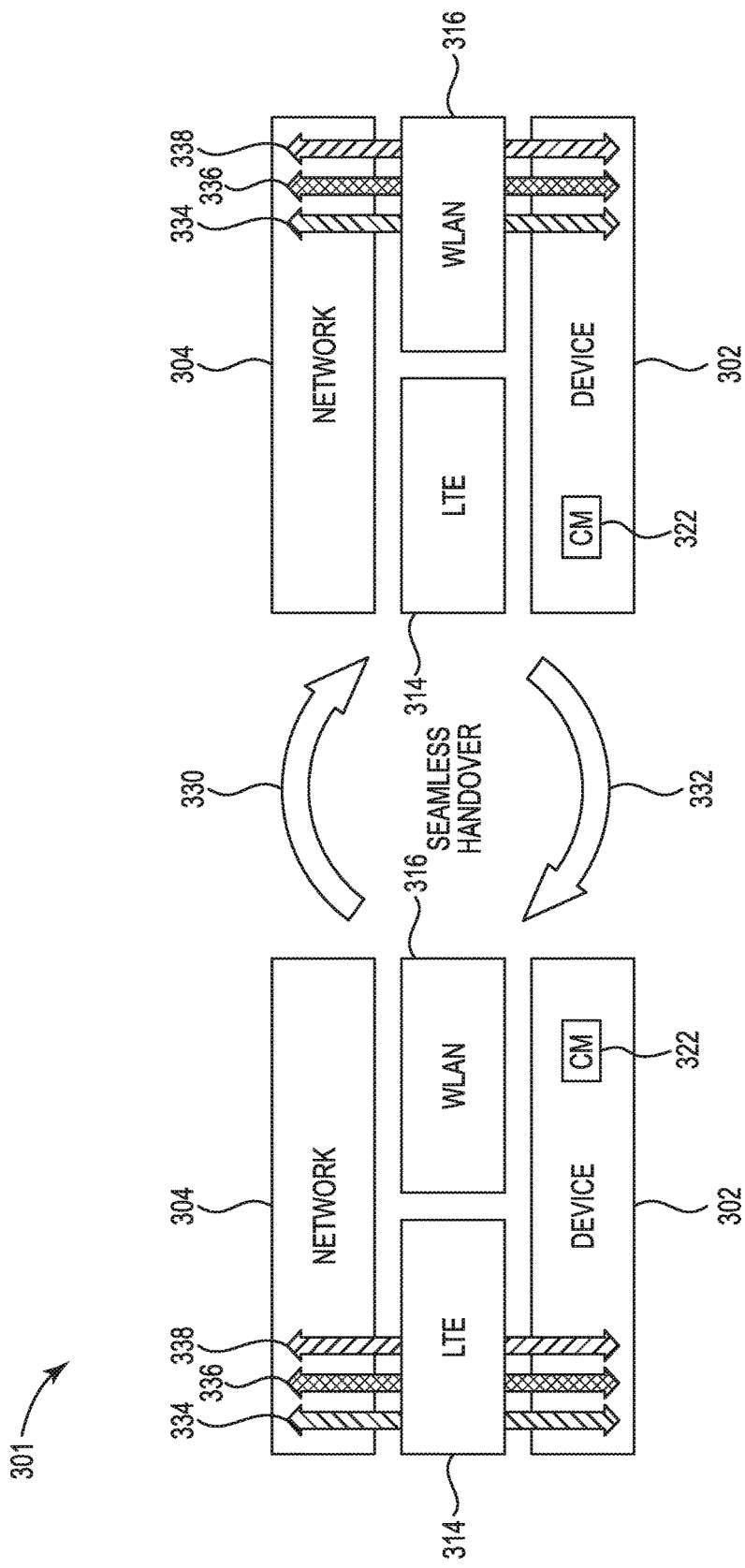
FIG. 3 illustrates a diagram of an example of network interface communication according to the present disclosure.

FIG. 3 illustrates a diagram 301 of an example of network interface communication according to the present disclosure. FIG. 3 is an example of a seamless handover of data transfer from a first network interface (e.g., WLAN interface) to a second network interface (e.g., LTE interface). For example, data transferring can be originally associated with an LTE interface 314 and be changed, at 330, to a WLAN interface 316.

A computing device (e.g., a communication device, computing device, laptop, phone, smartphone, etc.) can be coupled and/or in communication with an internet service (and/or a network) 304. The device may utilize software, hardware, firmware, and/or logic to perform functions described herein. The computing device 302 can include a Connection Manager ("CM") 322. The CM 322 may be any combination of hardware and program instructions to share information. The hardware, for example, may include a processing resource and/or a memory resource (e.g., non-transitory computer-readable medium (CRM), machine readable medium (MRM), database, etc.). A processing resource, as used herein, may include any quantity of processors capable of executing instructions stored by a memory resource.

CM 322 can include a module and/or a plurality of modules (e.g., decision module, a signaling module, etc.) and may include computer readable instruction (CRI) that when executed by the processing resource may perform functions. The module and/or a plurality of modules (e.g., decision module, signaling module, etc.) may be sub-modules of other modules. For example, the decision module and signaling module may be sub-modules and/or contained within the same computing device. In another example, the module and/or a plurality of modules (e.g., decision module, signaling module, etc.) may comprise individual modules at separate and distinct locations (e.g., CRM, etc.).

Each of the modules (e.g., decision module, signaling module) may include instructions that when executed by the processing resource may function as a corresponding engine as described herein. For example, the decision module and signaling module may include instructions that when executed by the processing resource may function as a decision and a signaling engine, respectively.

The communication device 302 can be using the communication with the internet 304 to send data associated with a number of computing operations. For example, the computing operations can include video conferencing 334, FTP communication 336, and/or downloading and/or viewing information associated with the internet 338. The communication device 302 can be transferring data via an LTE interface 314 (as illustrated on the left). While the communication device 302 is transferring data via the LTE interface 314, a WLAN interface 316 can be in communication with the communication device 302. For example, a session can be maintained with the WLAN interface 316 even though the WLAN interface 316 is not being used for transferring the data.

A handover from LTE to WLAN can be initiated by a decision module (e.g., decision module 224 in FIG. 2) on the device 302. The decision module can indicate to a signaling module (e.g., signaling module 226 in FIG. 2) to send a request message to a switch (e.g., switch 211) on a gateway (e.g., gateway 210) to change an interface (e.g., from LTE to WLAN in this example) used for transferring data. A request message can be sent (such as through signaling module 226 in FIG. 2) from the communication device 302 to a gateway (e.g., gateway 210 in FIG. 2) to seamlessly handover, as illustrated by arrow 330, data transfer from an LTE interface 314 to a WLAN interface 316. An IP address (such as IP address 219 in FIG. 2) can be associated with the communication device 302 for both the LTE interface 314 and the WLAN interface 316, both before, during, and/or after the seamless handover.

When a TCP connection is used for communication from the device 302 to the switch, the TCP connection will be verified prior to sending the request message. If no TCP connection is present, a TCP connection will be established. The switch (e.g., switch 211) can perform a change from a first interface (e.g., LTE interface) to a second interface (e.g., WLAN interface) on a gateway (e.g., gateway 210). The switch can send an indication that the interface change has occurred to the device 302. Once the device 302 receives the indication that the interface has been changed, the device 302 can change a route of outgoing data. For example, the device 302 can change a route to reflect a different uplink (e.g., uplink through a WLAN interface) by executing a rule (such as "ip rule del from <IP> lookup rmnet_data0") to enable a new out-going route for the data. The handover process has now changed to transferring data via the WLAN interface.

Subsequent to the handover, at 330, the communication device 302 can use a WLAN interface 316 to communicate with an internet service 304. The communication device 302 can be sending and/or receiving data associated with the number of computing operations described above using the WLAN interface 316. For example, the communication device 302 can maintain a session including video conferencing 334, FTP communication 336, and/or downloading and/or viewing information associated with the internet 338 even though data transferring has been changed from using an LTE interface 314 to a WLAN interface 316. That is, a first portion of data associated with the session of video conferencing 334 may have been sent using the LTE interface 314 prior to the handover occurring, at 330. A second portion of data associated with the session of video conferencing 334 may have been sent subsequent to the handover, at 330, using the WLAN interface 316. The session would have been maintained and a session associated with both the LTE interface 314 and the WLAN interface 316 would likewise be maintained. However, data would have changed from being transferred via the LTE interface 314 to being transferred via the WLAN interface 316.

The handover can include changing from using a WLAN interface 316 to using an LTE interface 314, as illustrated by arrow 332. The following process is the same as described above except that the result is using the LTE interface 314 for transferring data. This seamless handover with session continuity can achieve a handover with less than or no network delay. This can enable a switch from one interface to another while maintaining quality of data transfer. In some examples, the signaling can be enabled by both the device and the network in order to changed interfaces for implementing a number of application scenarios with various enterprise network policies. A mobility management and control can be performed on the network side and little to no IP stack changes may be needed on the device. In addition, less to no binding information and/or status information may be maintained on the device.

Figure 4:
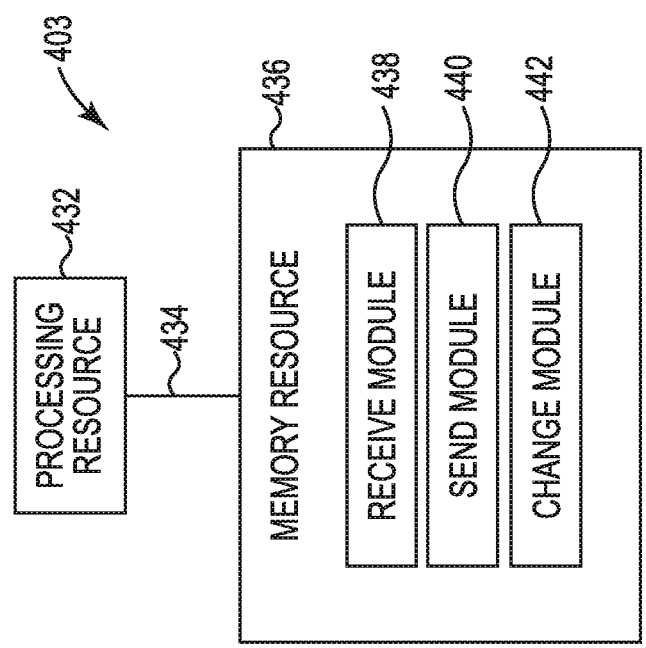
FIG. 4 illustrates a diagram of an example of network interface communication according to the present disclosure.

FIG. 4 illustrates a diagram of an example computing device according to the present disclosure. The computing device 403 can utilize software, hardware, firmware, and/or logic to perform functions described herein. The computing device 403 can be any combination of hardware and program instructions configured to share information. The hardware, for example, can include a processing resource 432 and/or a memory resource 436 (e.g., computer-readable medium (CRM), machine readable medium (MRM), database, etc.). A processing resource 432, as used herein, can include any number of processors capable of executing instructions stored by a memory resource 436. Processing resource 432 may be implemented in a single device or distributed across multiple devices. The program instructions (e.g., computer readable instructions (CRI)) can include instructions stored on the memory resource 436 and executable by the processing resource 432 to implement a desired function (e.g., receive a request to change from transferring data via a first interface to transferring data via a second interface, send an indication that a request has been accepted and performed, and/or change a route for transferring data from including a first interface to including a second interface).

The memory resource 436 can be in communication with a processing resource 432. A memory resource 436, as used herein, can include any number of memory components capable of storing instructions that can be executed by processing resource 432. Such memory resource 436 can be a non-transitory CRM or MRM. Memory resource 436 may be integrated in a single device or distributed across multiple devices. Further, memory resource 436 may be fully or partially integrated in the same device as processing resource 432 or it may be separate but accessible to that device and processing resource 432. Thus, it is noted that the computing device 403 may be implemented on a participant device, on a server device, on a collection of server devices, and/or a combination of the participant device and the server device.

The memory resource 436 can be in communication with the processing resource 432 via a communication link (e.g., a path) 434. The communication link 434 can be local or remote to a machine (e.g., a computing device) associated with the processing resource 432. Examples of a local communication link 434 can include an electronic bus internal to a machine (e.g., a computing device) where the memory resource 436 is one of volatile, non-volatile, fixed, and/or removable storage medium in communication with the processing resource 432 via the electronic bus.

A number of modules (e.g., receive module 438, send module 440, change module 442) can include CRI that when executed by the processing resource 432 can perform functions. The number of modules (e.g., receive module 438, send module 440, change module 442) can be sub-modules of other modules. For example, the receive module 438 and the send module 440 can be sub-modules and/or contained within the same computing device. In another example, the number of modules (e.g., receive module 438, send module 440, change module 442) can comprise individual modules at separate and distinct locations (e.g., CRM, etc.).

Each of the number of modules (e.g., receive module 438, send module 440, change module 442) can include instructions that when executed by the processing resource 432 can function as a corresponding engine as described herein. For example, the receive module 438 can include instructions that when executed by the processing resource 432 can function as a receive engine, the send module 440 can include instructions that when executed by the processing resource 432 can function as a send engine, and/or the change module can include instructions that when executed by the processing resource 432 can function as a change engine.

Figure 5:
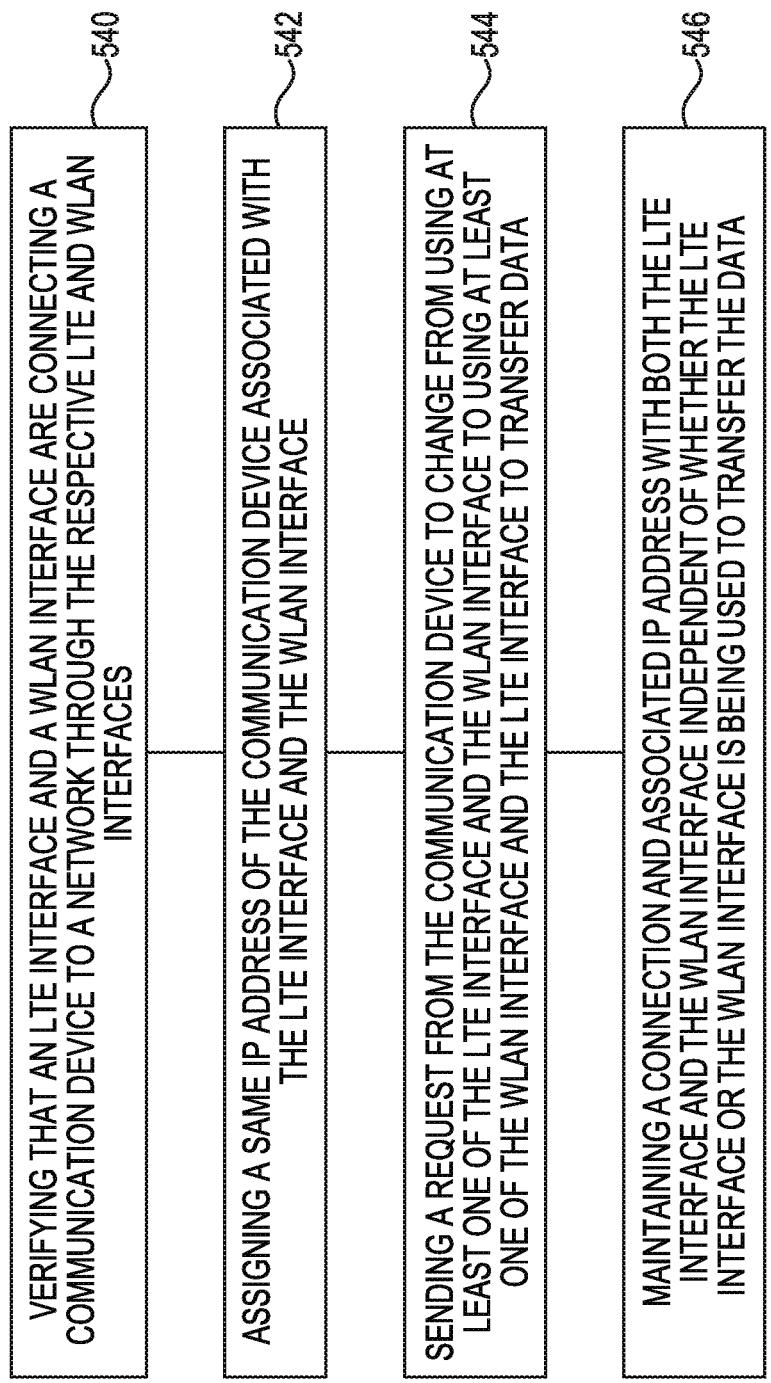
FIG. 5 illustrates an example of a method for network interface communication according to the present disclosure.

FIG. 5 illustrates an example of a method for network interface communication according to the present disclosure. The method can include verifying, at 540, that an LTE interface and a WLAN interface are connecting a communication device to a network through the respective LTE and WLAN interfaces. For example, the LTE interface and the WLAN interface can have a session associated with the device that is maintained, even though the LTE interface and the WLAN interface are not both being used to transfer data.

The method can include, at 542, assigning a same IP address of the communication device associated with a long-term evolution (LTE) interface and a wireless local area network (WLAN) interface. The IP address can be verified and stored both with the device and with a database associated with a gateway. The IP address can be used for using the LTE interface and the WLAN interface.

The method can include, at 544, sending a request from the communication device to change from using at least one of the LTE interface and the WLAN interface to using at least one of the WLAN interface to the LTE interface to transfer data. The request can be determined and/or indicated to be sent by a decision module and/or engine of the communication device. The request can be sent to a gateway (e.g., GW 210 in FIG. 2). Once the decision module indicates to send the request, the request can be sent via a signaling module (e.g., signaling module 226 in FIG. 2) of the communication device to the gateway.

The method can include, at 546, maintaining a connection and associated IP address with both the LTE interface and the WLAN interface independent of whether the LTE interface or the WLAN interface is being used to transfer the data. For example, the LTE interface may be used to transfer data and the WLAN interface will still maintain a session and an associated IP address associated with the device. The LTE interface will be maintaining the session and the associated IP address while sending and/or receiving the data as well.

The method can include receiving an indication that the request has been verified. When the request has been verified, data can be transferred through whichever of the LTE and WLAN interfaces the request is requesting to be changed to. The method can include continuing a session between the communication device and the network even though an interface used to transfer data has been changed.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a plurality of" something may refer to one or more such things. For example, both "a widget" and "a plurality of widgets" may refer to one or more widgets.

The figures herein follow a numbering convention in which the first digit or digits correspond to the drawing figure number and the remaining digits identify an element or component in the drawing. As will be appreciated, elements shown in the various embodiments herein may be added, exchanged, and/or eliminated so as to provide a plurality of additional embodiments of the present disclosure. In addition, as will be appreciated, the proportion and the relative scale of the elements provided in the figures are intended to illustrate certain embodiments of the present disclosure, and should not be taken in a limiting sense.

The above specification, examples and data provide a description of the method and applications, and use of the system and method of the present disclosure. Since many examples may be made without departing from the spirit and scope of the system and method of the present disclosure, this specification merely sets forth some of the many possible embodiment configurations and implementations.

What is claimed is:

1. A system for network interface communication, comprising:
   a communication device to communicate with a network;
   a long-term evolution (LTE) interface to communicatively couple the communication device to the network; and
   a wireless local area network (WLAN) interface to communicatively couple the communication device to the network;
   wherein:
      the communication device maintains an identical IP address for the LTE interface and the WLAN interface to communicate over the network;
      the communication device maintains a session associated with each of the LTE interface and the WLAN interface at the same time using the identical IP address while transmitting data to the network using only one of the LTE interface and the WLAN interface at a time;
      the communication device is configured to make decisions about switching from one of the LTE interface or WLAN interface to the other one of the WLAN interface or LTE interface, and to send a request message to signal a preference to transfer data via the WLAN interface or the LTE interface;
      while the communication device maintains the session associated with each of the LTE interface and the WLAN interface at the same time, and in response to making a decision to switch, the communication device is configured to transmit a request to a gateway between the communication device and the network to change from using one of the LTE interface and the WLAN interface to transfer data to using the other one of the WLAN interface and the LTE interface to transfer data;
      the communication device is configured to receive from the gateway, in response to the request, an indication that the request has been verified; and
      the communication device is configured, in response to the indication, to begin transmitting data using the interface that was requested to transfer data.

2. The system of claim 1, wherein the communication device is to change from using the LTE interface to using the WLAN interface and to maintain a connection during the change.

3. A non-transitory computer readable medium storing instructions executable by a processing resource to cause a computer to:
   receive, at a gateway, a request from a communication device to change from transferring data via a first interface to transferring data via a second interface, wherein the first interface and the second interface transfer the data between the communication device and a network, wherein at least part of the data is transferred via the first interface during a data session via the first interface between the communication device and the gateway, wherein the communication device is configured to make the decision to change from transferring data via the first interface to transferring data via the second interface, and to send a request message to signal a preference to transfer data via the second interface;
   in response to receiving the request from the communication device, send an indication from the gateway to the communication device that the request has been accepted and performed, wherein in response to receiving the indication, the communication device is configured to begin transmitting data using the second interface;
   change a route for transferring the data from including the first interface to including the second interface; and
   after changing the route for transferring the data from the first interface to the second interface, maintain the data session via the first interface between the communication device and the gateway.

4. The medium of claim 3, wherein the instructions are executable by the processing resource to cause the computer to verify a connection between the communication device and the gateway.

5. The medium of claim 4, wherein the instructions are executable by the processing resource to establish a connection between the communication device and the gateway when the verification determines that a connection between the communication device and the gateway does not exist.

6. The medium of claim 3, wherein the instructions are executable by the processing resource to receive a request to change from the second interface back to the first interface.

7. The medium of claim 6, wherein the instructions are executable by a processing resource to assign an identical IP address associated with both the first interface and the second interface.

8. The medium of claim 3, wherein the first interface is a long-term evolution (LTE) interface and the second interface is a wireless local area network (WLAN) interface.

9. A method, comprising:
   assigning a same IP address to each of an LTE interface and a WLAN interface of a communication device;
   verifying that each of the LTE interface and the WLAN interface are connecting the communication device to a network at the same time using the same assigned IP address;
   making a decision at the communication device to switch from one of the LTE interface or WLAN interface to the other one of the WLAN interface or LTE interface;
   while each of the LTE interface and WLAN interface are connecting the communication device to the network at the same time using the same assigned IP address, and in response to making the decision to switch, sending a request from the communication device to a gateway between the communication device and the network to change from using one of the LTE interface and the WLAN interface to transfer data to using the other one of the WLAN interface and the LTE interface to transfer data;
   receiving, at the communication device, from the gateway, in response to the request, an indication that the request has been verified;
   in response to the indication, begin transmitting data at the communication device using the interface that was requested to transfer data; and
   maintaining a connection and associated IP address with both the LTE interface and the WLAN interface independent of whether the LTE interface or the WLAN interface is being used to transfer data.

10. The method of claim 9, comprising continuing a session between the communication device and the network through a change of an interface used to transfer data.

* * * * *